United States Patent [19]

Tanaka et al.

[11] Patent Number: 5,652,360
[45] Date of Patent: Jul. 29, 1997

[54] CATIONIC STARCH COMPOSITION AND PROCESS FOR MAKING SAME

[75] Inventors: Hideyuki Tanaka, Okazaki; Hiroshige Murase, Takahama; Takahiro Kuno, Nagoya; Kyoko Kitamura, Handa, all of Japan

[73] Assignee: Japan Corn Starch Co., Ltd, Aichi, Japan

[21] Appl. No.: 472,933

[22] Filed: Jun. 6, 1995

[30] Foreign Application Priority Data

Jan. 24, 1995 [JP] Japan ................... 7-009007

[51] Int. Cl.$^6$ ....................... C11D 7/54
[52] U.S. Cl. ............... 536/45; 536/48; 536/49; 536/50; 536/55; 536/55.1; 536/55.3
[58] Field of Search .............. 536/45, 48, 49, 536/50, 55, 55.1, 55.3

[56] References Cited

U.S. PATENT DOCUMENTS

| 2,876,217 | 3/1959 | Paschall ................. 536/50 |
| 3,422,087 | 1/1969 | Caesar .................. 536/50 |
| 4,421,566 | 12/1983 | Hasuly et al. ............ 536/50 |

FOREIGN PATENT DOCUMENTS

| 43 01 459 A1 | 7/1994 | Germany. |
| WO86/02677 | 5/1986 | WIPO. |

OTHER PUBLICATIONS

Mar. 1990 Tappi Journal, "Using Cationic Starch in Filled Papers" (pp. 191–193), by Alince et al.
Starch/Stärke, 43 Nr. 3, "The Cationic Distribution in a Cationised Potato Starch" (pp. 81–82), by Salomonsson et al.
Starch/Stärke, 42 (1990) Nr. 2, "The Effect of Different Methods of Cationisation on the Starch Granule and Its Gelatinisation Product" (pp. 64–68), by Vihervaara et al.
Starch/Stärke, 39 (1987) Nr. 11, "Die Molekulare Charakterisierung von Hydrolytisch Abgebauten Stärken Mittels Hochleistungs–GPC–Analyse" (pp. 397–402), Praznik et al (no English translation available).
Starch/Stärke, 41 (1989) Nr. 1, "The Benefits of Cationic Starches for the Paper Industry" (pp. 27–31), Nachtergaele et al.

*Primary Examiner*—Nathan M. Nutter
*Attorney, Agent, or Firm*—Niro, Scavone, Haller & Niro

[57] ABSTRACT

Disclosed herein is a new cationic starch and cationic starch paste or slurry. The starch paste or slurry has a low cation equivalent value despite its high nitrogen content and also has a low solution viscosity despite its high molecular weight. The cationic starch and cationic starch paste or slurry is formed by substitution with a one or both of quaternary ammonium salt or a tertiary amino group, characterized in that its nitrogen content (X) due to the quaternary ammonium salt and/or tertiary amino group is related to its cation equivalent value (Y) as defined below:

$$Y<0.70097X-0.07978$$

(in the case of natural terrestrial stem starch)

$$Y<0.32936X-0.00495$$

(in the case of natural subterranean stem starch having ester-type substituents)

$$Y<0.40942X+0.02211$$

(in the case of natural subterranean stem starch having no ester-type substituents)

17 Claims, 1 Drawing Sheet

|  | EXAMPLE | COMPARATIVE EXAMPLE |
|---|---|---|
| NATURAL TERRESTRIAL STEM STARCH | ▲ | △ |
| NATURAL SUBTERRANEAN STEM STARCH HAVING ESTER-TYPE SUBSTITUENTS | ■ | □ |
| NATURAL SUBTERRANEAN STEM STARCH HAVING NO ESTER-TYPE SUBSTITUENTS | ● | ○ |

CATIONIC STARCH COMPOSITION AND PROCESS FOR MAKING SAME

BACKGROUND OF THE INVENTION

1. Field of the Invention

The present invention relates to cationic starch and a cationic starch paste or slurry for papermaking which has a high nitrogen content and yet has a low cation equivalent value. The present invention relates also to a process for producing the same.

Major terms and abbreviations used in this specification are defined below.

(1) Cation equivalent value (meq): Expressed in terms of values measured by the colloidal titration of starch paste solution with PVSK (potassium polyvinylsulfate).

(2) Viscosity: Expressed in terms of values measured on a 1 wt % sample at 50° C. with a Brookfield viscometer, unless otherwise mentioned.

(3) Nitrogen content: Expressed in terms of percentage (%) values measured on a sample of cationic starch by the semimicro Kjeldahl method.

(4) DS value: Expressed in terms of an average of the number of substituted hydroxyl groups per glucose residue. It represents the degree of esterification and etherification of a derivative.

2. Description of the Prior Art

The recent trend in the papermaking industry is toward the use of increasing amounts and varieties of cationic chemicals for stable papermaking machine operation under the condition that more DIP (deinked pulp) and waste paper pulp are used than before. The consequence is an overall increase of cation equivalent value in the papermaking system containing as much general-purpose cationic starch as before. This in turn raises the zeta potential in the system, making it difficult to maintain it in the optimum range of $-5$ mV to $\pm 0$ mV in the wet end of paper making system. Therefore, although Cationic starch is essential for dry strength, it is necessary to limit cationic starch in its dosage amount and its degree of cationization. Such limitation, however, decreases the effect of cationic starch on flocculation or bonding of pulp fiber or fine fiber which is proportional to the amount and the degree of cationization.

The degree of cationization is proportional to nitrogen content in cationic starch, because cationic starch is produced by replacing the hydroxyl group in starch with a quaternary ammonium salt and/or a tertiary amino group. Thus, there has been a demand for a cationic starch and a cationic starch paste solution thereof for papermaking which has a high nitrogen content (which relates to the degree of cationization and the amount of cationic starch) and yet has a relatively low cation equivalent value.

It is common practice to use cationic starch powder in the papermaking process by adding it in the form of a starch paste or slurry to the machine chest, mixing chest, or fan pump for uniform dispersion into the paper stock. Uniform dispersion is desirable for improved paper strength and improved size yield.

Unfortunately, these requirements are not met by conventional cationic starch which has a high solution viscosity because it doe snot undergo acid treatment or oxidation (to lower the viscosity) in its manufacturing process. Conversely, lowering the viscosity also reduces the molecular weight of cationic starch, which adversely affects the performance of cationic starch. This is another reason why there has been a demand for a cationic starch and starch paste solution thereof for papermaking that has the above-mentioned dual characteristic properties.

SUMMARY OF THE INVENTION

The present invention is directed to a new cationic starch and cationic starch paste or slurry and a process for the production thereof, where the cationic starch and starch paste have a high nitrogen content and yet a low cation equivalent value, and also have a high molecular weight and yet a low solution viscosity.

The first aspect of the present invention resides in a cationic starch and starch paste solution thereof formed by substitution with a quaternary ammonium salt and/or tertiary amino group, characterized in that its nitrogen content (X) due to said quaternary ammonium salt and/or tertiary amino group is related to its cation equivalent value (Y) as defined below.

$Y<\text{about } 0.7X-\text{about } 0.08$ (in the case of natural terrestrial stem starch)

$Y<\text{about } 0.3X-\text{about } 0.5$ (in the case of natural subterranean stem starch having ester-type substituents)

$Y<\text{about } 0.4X+\text{about } 0.02$ (in the case of natural subterranean stem starch having no ester-type substituents)

The second aspect of the present invention resides in a process for producing the cationic starch defined above. The process comprises cationizing esterified natural starch, cationizing etherified natural starch, or carrying out the cationization by reactions in a plurality of steps or in one step. According to the present invention, the paste or slurry of cationic starch preferably contains less than 5.5% salt per starch in paste solution. It is produced either by adding a salt component to the reaction slurry before, during, or after the esterification or etherification and/or cationization, and drying the starch without its washing or with its incomplete washing such that salt remains in the starch, or by adding a salt component to the cationic starch before or after its gelatinization.

BRIEF DESCRIPTION OF THE DRAWINGS

The novel features which are characteristic of the present invention are set forth in the appended claims. The invention itself, however, together with further objects and attendant advantages, will be best Understood by reference to the following description taken in connection with the accompanying drawings in which:

DESCRIPTION OF THE PREFERRED EMBODIMENTS

Figure 1:
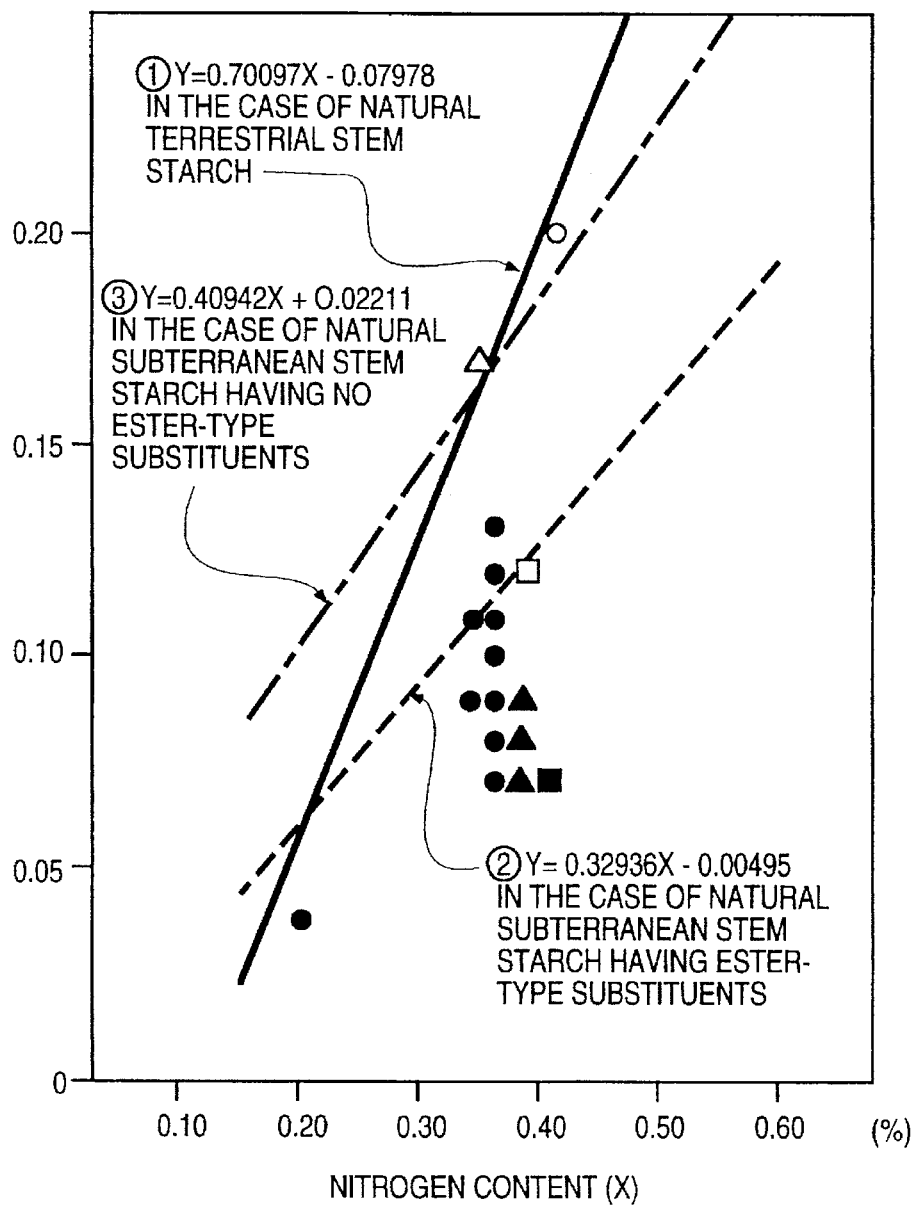
FIG. 1 is a graph showing the relation between the nitrogen content (X) and the cation equivalent value (Y) of the size solution of the cationic starch according to the present invention.

In the following description, constituent percentages are based on weight, unless otherwise specified.

The present invention covers cationic starch and a cationic starch paste or slurry formed by substitution with a quaternary ammonium salt and/or a tertiary amino group, characterized in that its nitrogen content (X) due to said quaternary ammonium salt and/or tertiary amino group is preferably related to its cation equivalent value (Y) as defined below.

$$Y<0.70097X-0.07978$$

(in the case of natural terrestrial stem starch)

$$Y<0.32936X-0.00495$$

(in the case of natural subterranean stem starch having ester-type substituents)

$$Y<0.40942X+0.02211$$

(in the case of natural subterranean stem starch having no ester-type substituents)

The expression of relations given above, and illustrated in FIG. 1, signifies that the relation between the nitrogen content and the cation equivalent value in the cationic starch of the present invention is represented by the straight lines and the area under the straight lines.

The starch used in the present invention is any of natural terrestrial stem starch (which includes corn starch, waxy corn starch, and wheat starch), natural subterranean stem starch having ester-type substituents (in the unprocessed state) (which includes potato starch), and natural subterranean stem starch having no ester-type substituents (which includes tapioca starch and sweet potato starch). It may be slightly modified by esterification, etherification, oxidation, acid treatment, or dextrination. Such modified starch may be used individually or in combination with one another or in combination with plain starch.

The cationic starch in the present invention should contain 0.15–0.60% nitrogen based upon the starch component, preferably 0.15–0.50% nitrogen. The nitrogen content is an indirect measure of the degree of cationization. With a nitrogen content less than 0.15% of the starch component, the cationic starch does not have sufficient plus charge for cohesive force to form flocks in paper stock. If the nitrogen content is higher than 0.15% and the cation equivalent value (Y) is larger than that specified by the expression of relation between the nitrogen content and the cation equivalent value (Y), then the cationic starch will excessively form flock in paper stock when used in an amount more than prescribed. With a nitrogen content in excess of 0.60% of the starch component, the cationic starch does not provide sufficient interfiber bonding force (which leads to insufficient paper strength) when used in an amount just enough not to disturb the formation of paper.

The viscosity of the paste or slurry of cationic starch should preferably be lower than 200 cP (measured on a sample of 1% concentration at 50° C.). In the case of natural terrestrial stem starch and natural subterranean stem starch having no ester-type substituents, it should preferably be lower than 100 cP. In the case of natural subterranean stem starch having ester-type substituents, it should preferably be lower than 150 cP. A paste of cationic starch with an excessively high viscosity presents difficulties in uniform dispersion into paper stock.

For the above-mentioned expression of relations to be satisfied according to the present invention, it is necessary that the content of salt component be less than 5.5% of the starch component, preferably less than 5.1% more preferably less than 4.1%. The function of the salt component is to relatively lower the cation equivalent value and viscosity of the paste of cationic starch. A salt component content in excess of 5.5% of the starch component in the paste solution retards the disintegration and dispersion of starch micells at the time of gelatinization.

The salt component is mainly an alkali metal or alkaline earth metal salt of an inorganic or organic acid. Examples include salts of inorganic acids such as sulfuric acid, nitric acid, phosphoric acid, hydrochloric acid, and carbonic acid; and salts of organic acids such as formic acid, acetic acid, butanoic acid, octanoic acid, stearic acid, (and other aliphatic saturated and unsaturated carboxylic acids), and benzoic acid (and other aromatic carboxylic acids). Preferred examples include salts of sulfuric acid, phosphoric acid, and carbonic acid, and salts of aliphatic saturated or unsaturated carboxylic acid having 2–7 carbons. These salts may be used in combination with one another.

There are two ways of adding the salt component to the paste or slurry solution of cationic starch. According to one embodiment, the salt component is added to the reaction slurry before, during, or after the esterification or etherification and/or cationization, and drying the starch without its washing or with its incomplete washing such that salt remains in the starch. According to another embodiment, the salt component is added to the cationic starch before or after its gelatinization. In the first embodiment, it is desirable to add a salt of an inorganic or organic acid in an amount more than 5% based on the weight of anhydrous starch, because the washing step usually follows the esterification, etherification, or cationization (except the one which is carried out last). An amount more than 5% per starch is necessary for uniform reaction without starch swelling. Any fraction in excess of 5% per starch will be removed in the washing step, and the content of salt in the cationic starch eventually decreases to 5.5% per starch or less.

The above-mentioned expression of relation may be satisfied if the cationic starch is produced by cationizing esterified natural starch, cationizing etherified natural starch, or carrying out the cationization by reactions in a plurality of steps.

The esterification may be accomplished in the usual way with one or more esterifying agents listed below. The degree of esterification should be DS 0.00005–0.05, preferably DS 0.000075–0.030. The step of esterification may be omitted if commercial low-substituted esterified starch is used. Suitable esterifying agents include:

(i) Acid halide or acid anhydride of saturated or unsaturated carboxylic acids (having 2–18 carbons) or aromatic carboxylic acids. Examples of saturated or unsaturated carboxylic acids include acetic acid propionic acid, octanoic acid, stearic acid, and oleic acid. Examples of aromatic carboxylic acids include benzoic acid. Of these examples, acetic acid and propionic acid are preferable.

(ii) Vinyl ester monomer with a C2–18 ester component. Examples include vinyl esters of aliphatic saturated and unsaturated carboxylic acids (such as vinyl acetate, vinyl propionate, vinyl butanoate, and vinyl acrylate), and vinyl esters of aromatic carboxylic acids (such as vinyl benzoate, and vinyl p-methylbenzoate). Of these examples, vinyl acetate monomer and vinyl propionate monomer are preferable. They may be used in combination with one another.

(iii) Derivatives of sulfonic acid, sulfinic acid, and phosphoric acid which have a C1–18 saturated or unsaturated hydrocarbon group or an aromatic hydrocarbon group.

The saturated or unsaturated hydrocarbon group includes methyl, propyl, octenyl, stearyl, and oleyl. The aromatic hydrocarbon group includes benzyl and toluyl.

(iv) Phosphates, which include alkali metal salts and alkaline earth metal salts of orthophosphoric acid, metaphosphoric acid, tripolyphosphoric acid, hexametaphosphoric acid, and phosphorous acid. Of these examples, alkali metal salts and alkaline earth metal salts of orthophosphoric acid, tripolyphosphoric acid, and phosphorous acid are preferable.

(v) Others, such as nitrated or nitrochlorinated aromatic or aliphatic compounds, and sulfuric acid.

The etherification may be accomplished in the usual way with one or more etherifying agents (mono or diepoxides) listed below. The degree of etherification should be DS 0.00005–0.05, preferably DS 0.000075–0.030. Suitable etherifying agents include: Mono or diepoxides including ethylene oxide, propylene oxide, 1,6-hexanediol diglycidyl ether, 1,5-pentanediol diglycidyl ether, p-diethoxybenzene, and 1,5-dipropoxynaphthalene, which have 2–18 carbons. Of these examples, ethylene oxide, propylene oxide, 1,4-buthanediol glycidyl ether, and 1,6-hexanediol glycidyl ether, which have 2–7 carbons, are preferably, with the first three being more desirable.

As mentioned above, the cationization may be accomplished in one step or in a plurality of steps.

(i) The cationization may be accomplished by the aid of any cationizing agent, such as a quaternary ammonium salt and a tertiary amine compound, alone or in combination.

Any commercial quaternary ammonium salt of chlorohydrin type or glycidyl type is of practical use from the standpoint of economy and easy operation. It is represented by the structural formula:

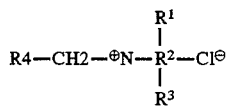

(where $R^1$, $R^2$, and $R^3$ each denotes an alkyl group; and R4 denotes a substituent including a chlorohydrin or glycidyl group.)

A typical example of a quaternary ammonium salt is N,N-dimethyl-1-chloro-2-hydroxypropylammonium chloride.

The tertiary amine compound is represented by the formula below:

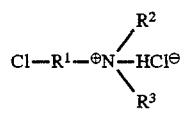

(where $R^1$, $R^2$, and $R^3$ each denotes an alkyl group.) A typical example thereof is β-chloroethyldiethylamine hydrochloride.

(ii) In the case where the cationization is carried out in plural steps, the cationizing agent should be divided into two or more portions, which are fed sequentially at intervals longer than four hours.

There are no restrictions on the mode of the above-mentioned esterification, etherification, and cationization. They may be carried out by the wet process (in an aqueous slurry), the dry process (which employs a disc dryer or fluidized bed roaster), or the on-site reaction in a paper mill (which involves gelatinization).

The cationic starch and cationic starch slurry of the present invention produce the following effects as demonstrated by the examples and comparative examples given later.

The cationic starch has a cation equivalent value which remains low even though the content of nitrogen therein (or the degree of cationization) is increased. The result is that it is possible to use a cationic starch of high nitrogen content without excessive increase of zeta potential in the papermaking system. This facilitates control of the papermaking system, allowing the amount of starch to be varied over a broad range according to the desired paper strength.

Because of its low viscosity despite of its high molecular weight, the cationic starch is readily and uniformly dispersed into paper stock without adverse effect on paper strength. This leads to a high yield of the cationic starch in paper.

EXAMPLES

The invention will be described with reference to the following Examples and Comparative Examples, in which the cationizing agent was N,N-dimethyl-1-chloro-2-hydroxypropylammonium chloride. Examples 1 to 7 demonstrate the case in which subterranean stem starch having no ester-type substituents was esterified and then cationized.

Example 1

A 2-liter flask was charged with 500 g of tapioca starch and 750 of tap water. To the resulting starch slurry was added with stirring 4% NaOH solution to adjust it to pH 10.0. The starch was esterified with acetic anhydride (0.5% of starch). To the esterified starch were added 58 g of cationizing agent and 25 g of sodium sulfate (which prevents swelling). The slurry was adjusted to pH 11.5–12.0 with 4% NaOH solution and underwent reaction for 16 hours.

Example 2

The same procedure as in Example 1 was repeated except that the esterifying agent was replaced by propionic acid chloride.

Example 3

The same procedure as in Example 1 was repeated except that the esterifying agent was replaced by vinyl acetate.

Example 4

The same procedure as in Example 1 was repeated except that the esterifying agent was replaced by sodium p-toluenesulfonate.

Example 5

The same procedure as in Example 1 was repeated except that the esterifying agent was replaced by octanoic anhydride.

Example 6

The same procedure as Example 1 was repeated except that the esterifying agent was replaced by acrylic acid chloride.

Example 7

The same procedure as Example 1 was repeated except that the esterifying agent was replaced by vinyl octanoate.

Examples 8 and 9 demonstrate the case in which the slurry of cationic starch was incorporated with an alkali metal salt of an inorganic acid.

Example 8

The cationic starch obtained in Example 1 was incorporated with sodium sulfate (3.0% of starch).

Example 9

The cationic starch obtained in Example 3 was incorporated with sodium sulfate (3.0% of starch).

Examples 10 to 12 demonstrate the case in which the starch was natural terrestrial stem starch.

Example 10

The same procedure as in Example 9 was repeated except that the natural starch was corn starch.

Example 11

The same procedure as in Example 9 was repeated except that the natural starch was waxy corn starch.

Example 12

The same procedure as in Example 9 was repeated except that the natural starch was wheat starch.

Example 13

This example demonstrates the case in which subterranean stem starch having ester-type substituents was esterified and then cationized and the slurry of cationic starch was incorporated with an alkali metal salt of an inorganic acid. The same procedure as in Example 9 was repeated except that the natural starch was potato starch.

Example 14

This example demonstrates the case in which subterranean stem starch having no ester-type substituents was esterified and then cationized with an increased amount of cationizing agent. The same procedure as in Example 9 was repeated except that the amount of cationizing agent was increased to 32 g.

Example 15

This and next examples demonstrate the case in which subterranean stem starch having no ester-type substituents was cationized in a single step and the slurry of cationic starch was incorporated with an alkali metal salt of an inorganic acid.

A 2-liter flask was charged with 500 g of tapioca starch and 750 of tap water. To the resulting starch slurry were added 58 g of cationizing agent and 25 g of sodium sulfate (which prevents swelling). To the slurry was further added with stirring 4% NaOH solution to adjust it to ph 11.5–12.0. The slurry underwent reaction for 16 hours. After dehydration, washing, and drying, the cationic starch was incorporated with sodium sulfate (3.0% of anhydrous starch).

Example 16

The same procedure as in Example 15 was repeated except that sodium sulfate was replaced by sodium chloride (3.0% of starch).

Example 17

This example demonstrates the case in which subterranean stem starch having no ester-type substituents was etherified and then cationized.

A 2-liter flask was charged with 500 g of tapioca starch and 750 of tap water. To the resulting starch slurry was added with stirring 4% NaOH solution to adjust it to ph 11.5–12.0. The starch was etherified with 5.4 g of propylene oxide by reaction under a nitrogen stream for 16 hours. Then the starch was cationized with 58 g of cationizing agent by reaction for 16 hours.

Example 18

This example demonstrates the case in which subterranean stem starch having no ester-type substituents was cationized in several reaction steps.

A 2-liter flask was charged with 500 g of tapioca starch and 750 of tap water. To the resulting starch slurry was added with stirring 4% NaOH solution to adjust it to ph 11.5–12.0. The starch was cationized with the cationizing agent which was added in portions of 19 g, 19g, and 20 g, at intervals of 4 hours. After the addition, reaction was continued for 12 hours.

Example 19

This example demonstrates the case in which subterranean stem starch having no ester-type substituents was esterified and then cationized, with an alkali metal salt of an inorganic acid added to the starch slurry prior to cationization.

The starch slurry obtained in Example 1 was incorporated with sodium sulfate (3.0% of starch), and then the starch was gelatinized.

Example 20

This example demonstrates the case in which subterranean stem starch having no ester-type substituents was esterified and then cationized, with an alkali metal salt of an inorganic acid added to the starch solution prior to cationization.

The starch slurry obtained in Example 1 was gelatinized and then sodium sulfate was added to the starch solution.

Example 21

This example demonstrates the case in which subterranean stem starch having no ester-type substituents was esterified and then cationized, with an alkali metal salt of an inorganic acid added prior to cationization.

The procedure in Example 1 was modified such that 20 g of sodium sulfate was previously added to the cationizing reaction solution, and the cationized product was dried without purification.

Comparative Example 1 (Conventional practice for natural subterranean stem starch having ester-type substituents)

A 2-liter flask was charged with 500 g of potato starch and 750 of tap water. To the resulting starch slurry was added 25 g of sodium sulfate (which prevents swelling). To the starch slurry was further added with stirring 4% NaOH solution to adjust it to ph 11.5–12.0. To the starch was added 58 g of cationizing agent. After dehydration, washing, and drying, there was obtained conventional cationic starch.

Comparative Example 2 (Conventional practice for natural subterranean stem starch having ester-type substituents)

The same procedure as in Comparative Example 1 was repeated except that the natural starch was replaced by corn starch.

Comparative Example 3 (Conventional practice for natural subterranean stem starch having ester-type substituents)

The same procedure as in Comparative Example 1 was repeated except that the natural starch was replaced by tapioca starch.

Evaluation Tests (Methods and Results)

A. The samples of cationic starch and size solution thereof obtained in the foregoing examples and comparative examples were tested in the following manner.

1. Nitrogen content: measured by the semimicro Kjeldahl method.
2. Viscosity of starch solution: measured with a Brookfield viscometer at 50° C. on a sample which had been gelatinized by heating (with stirring) at 90° C. for 20 minutes in a steam bath.
3. Cation equivalent value: determined by colloidal titration of the starch solution with PVSK, the end point being indicated by color change from blue to red.

The test results are shown in Table 1 and plotted in FIG. 1. It is noted that the samples in Examples 1–21 have the characteristic properties which satisfy the expression of relation given in claim 1, but this is not true for the samples in the Comparative Examples.

B. The samples of cationic starch and size solution thereof obtained in the foregoing examples and comparative examples were used for alkali papermaking under the following conditions.

Pulp: LBKP/NBKP—70/30
Filler: calcium bicarbonate (20% of pulp)
Sizing agent: AKD
CSF: 300 mL The resulting paper samples were tested in the following manner.

1. Zeta potential: measured with a steaming potentiometer.
2. Breaking length: measured according to JIS P-8113.
3. Yield of cationic starch: calculated by dividing the content of starch in paper sample by the amount of starch added to paper stock.

The test results are shown in Table 2. It is apparent that the samples obtained in Examples 1–21 have a zeta potential in an adequate range, but this is not true for the samples obtained in the Comparative Examples. It is also apparent that the samples in Examples 1–21 are superior to those in the Comparative Examples in breaking length and yield of cationic starch.

TABLE 1

| Sample No. | Viscosity of Starch Solution | Nitrogen Content (X %) | Cation Equivalent Value (Ymeq) |
|---|---|---|---|
| 1 | 250 | 0.36 | 0.12 |
| 2 | 200 | 0.35 | 0.11 |
| 3 | 195 | 0.36 | 0.12 |
| 4 | 210 | 0.36 | 0.10 |
| 5 | 220 | 0.36 | 0.11 |
| 6 | 180 | 0.36 | 0.13 |
| 7 | 200 | 0.36 | 0.10 |
| 8 | 57 | 0.35 | 0.09 |
| 9 | 48 | 0.36 | 0.09 |
| 10 | 40 | 0.37 | 0.07 |
| 11 | 45 | 0.37 | 0.08 |
| 12 | 46 | 0.37 | 0.09 |
| 13 | 105 | 0.38 | 0.07 |
| 14 | 28 | 0.20 | 0.04 |
| 15 | 51 | 0.36 | 0.08 |
| 16 | 230 | 0.36 | 0.11 |
| 17 | 60 | 0.36 | 0.07 |
| 18 | 165 | 0.36 | 0.10 |
| 19 | 88 | 0.36 | 0.08 |
| 20 | 95 | 0.36 | 0.07 |
| 21 | 78 | 0.36 | 0.07 |

TABLE 1-continued

| Sample No. | Viscosity of Starch Solution | Nitrogen Content (X %) | Cation Equivalent Value (Ymeq) |
|---|---|---|---|
| (1) | 285 | 0.38 | 0.12 |
| (2) | 185 | 0.35 | 0.17 |
| (3) | 290 | 0.41 | 0.20 |

Comparative samples are indicated by parenthesized numbers.

TABLE 2

| Sample No. | Yield of Cationic Starch (%) | Zeta-Potential (mV) | Breaking Length (kgf) |
|---|---|---|---|
| 1 | 85 | −1.27 | 5.80 |
| 9 | 90 | −1.09 | 5.94 |
| 10 | 88 | −1.00 | 5.77 |
| 13 | 94 | −1.15 | 5.86 |
| 17 | 89 | −0.98 | 5.90 |
| 19 | 80 | −1.10 | 5.78 |
| 20 | 86 | −1.18 | 5.91 |
| (1) | 64 | −0.55 | 4.95 |
| (2) | 71 | −0.29 | 3.91 |
| (3) | 68 | −0.15 | 4.10 |

Comparative samples are indicated by parenthesized numbers.

It will be appreciated by those skilled in the art that various modifications and changes can be made to the illustrated embodiments without departing from the spirit of the present invention. All such modifications and changes are intended to be covered by the appended claims.

What is claimed is:

1. A composition comprising a cationic starch formed by substitution with one or both of a quaternary ammonium salt or a tertiary amino group; said cationic starch being (i) derived from a natural terrestrial stem starch and having a nitrogen content (X) and a cation equivalent value (Y) wherein Y<(about 0.7X–about 0.08), (ii) derived from a natural subterranean stem starch having ester-type substituents and having a nitrogen content (X) and a cation equivalent value (Y) wherein Y<(about 0.3X–about 0.005), or (iii) derived from a natural subterranean stem starch having no ester-type substituents and having a nitrogen content (X) and a cation equivalent value (Y) wherein Y<(about 0.4X+about 0.02).

2. The composition of claim 1 wherein said cationic starch is formed into a cationic starch paste or slurry.

3. The cationic starch composition as defined in claim 1 or claim 2, wherein the nitrogen content in the cationic starch is about 0.15–0.60% based on the starch component.

4. The cationic starch composition as defined in claim 1 or claim 2, wherein the viscosity of the solution is lower than 200 cP.

5. The cationic starch composition as defined in claim 1 or claim 2, wherein a salt component is present in an amount less than 5.5% based on the starch component.

6. The cationic starch composition as defined in claim 5, wherein the salt component is one whose principal ingredient is an alkali metal salt or alkaline earth metal salt of an inorganic or organic acid.

7. A process for forming a cationic starch composition comprising the steps of forming a reaction slurry and cationizing a natural starch by substituting the natural starch with one or both of a quaternary ammonium salt or a tertiary amino group, whereby the cationic starch thus formed is either (i) derived from a natural terrestrial stem starch having a nitrogen content (X) and a cation equivalent value (Y) wherein Y<(about 0.7X–about 0.08), (ii) derived from a natural subterranean stem starch having ester-type substituents, a nitrogen content (X) and a cation equivalent value (Y) wherein Y<(about 0.3X–about 0.005), or (iii) derived from a natural subterranean stem starch having no ester-type substituents and a nitrogen content (X) and a cation equivalent value (Y) wherein Y<(about 0.4X+about 0.02).

8. A process for producing the cationic starch composition as defined in claim 7, said process comprising the additional step of esterifying the natural starch within the reaction slurry prior to cationization.

9. A process for producing the cationic starch composition as defined in claim 7, said process comprising the additional step of etherifying the natural starch within the reaction slurry prior to cationization.

10. A process for producing the cationic starch composition as defined in claim 7 wherein said cationizing natural starch is accomplished by reaction in plural steps or in one step therein.

11. The process for producing a cationic starch composition as defined in claim 10, wherein the reaction in plural steps is carried out such that the cationizing agent is divided into two or more portions and the portions are added at intervals longer than four hours for sequential reactions.

12. The process for producing a cationic starch composition as defined in claim 8, said process further comprising the steps of adding a salt component to the reaction slurry before, during or after the esterification, and drying the starch composition with no washing or with incomplete washing such that the salt component remains in the starch composition.

13. The process for producing a cationic starch composition as defined in claim 9, said process further comprising the steps of adding a salt component to the reaction slurry before, during or after the esterification and drying the starch composition with no washing or with incomplete washing such that the salt component remains in the starch composition.

14. The process for producing a cationic starch composition as defined in claim 10, said process further comprising the steps of adding a salt component to the reaction slurry before, during or after the cationization and drying the starch composition with no washing or with incomplete washing such that the salt component remains in the starch composition.

15. The process for producing a cationic starch composition as defined in claim 8, said process further comprising the steps of gelatinization of the starch component either before or after the gelatinization.

16. The process for producing a cationic starch composition as defined in claim 9, said process further comprising the steps of gelatinization of the starch slurry and addition of a salt component either before or after the gelatinization.

17. The process for producing a cationic starch composition as defined in claim 10, said process further comprising the steps of gelatinization of the starch slurry and addition of a salt component either before or after the gelatinization.

* * * * *